J. N. WAKE.

LEATHER CUTTING MACHINE.

No. 10,249. Reissued Nov. 28, 1882.

WITNESSES.

Geo. W. Carey.

Henry J. Stapelton.

INVENTOR.

John N. Wake by Edwin Salisbury Jones

Attorney.

N. PETERS, Photo-Lithographer, Washington, D. C.

UNITED STATES PATENT OFFICE.

JOHN N. WAKE, OF PROVIDENCE, RHODE ISLAND.

LEATHER-CUTTING MACHINE.

SPECIFICATION forming part of Reissued Letters Patent No. 10,249, dated November 28, 1882.

Original No. 261,188, dated July 18, 1882. Application for reissue filed October 21, 1882.

*To all whom it may concern:*

Be it known that I, JOHN N. WAKE, of the city and county of Providence, and State of Rhode Island, have invented a new and useful Improvement in Machines for Cutting Leather and other Materials into Strips; and I do hereby declare that the following specification, taken in connection with the accompanying drawings, forming a part of the same, is a full, clear, and exact description thereof.

My invention relates to a machine which is composed of a frame, a pair of feed-rolls mounted therein and provided with peripherical grooves, and a series of knives located in said grooves for the purpose of cutting leather, cloth, paper, &c., into strips.

My improvement consists in providing the frame of the machine with a side opening to allow of the free passage of material wider than the machine, in order that strips may be cut from the side of the material; in arranging the cutting-edges of the knives at an inclination to the plane in which the material is fed, thereby insuring a cleaner cut and requiring less power to drive the machine than when the cutting-edges are placed at right angles to said plane, and in providing the machine with an adjustable gage to govern the width of the strip cut from the edge of the material.

Figure 1:
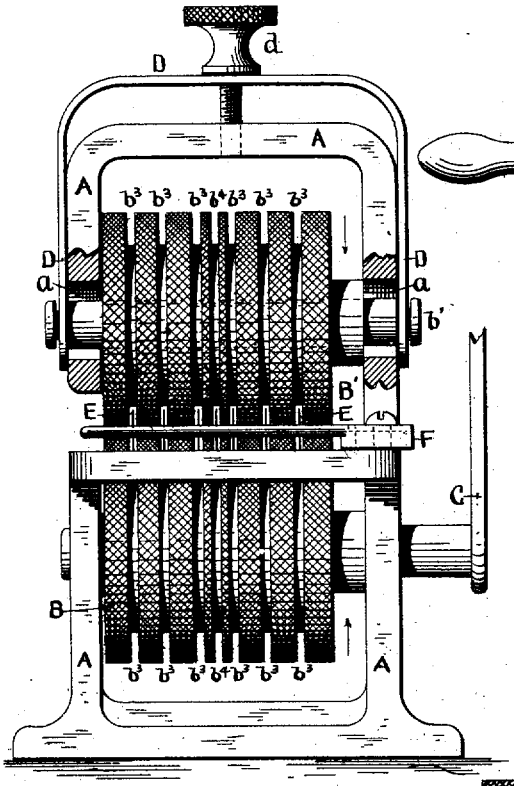
Figure 2:
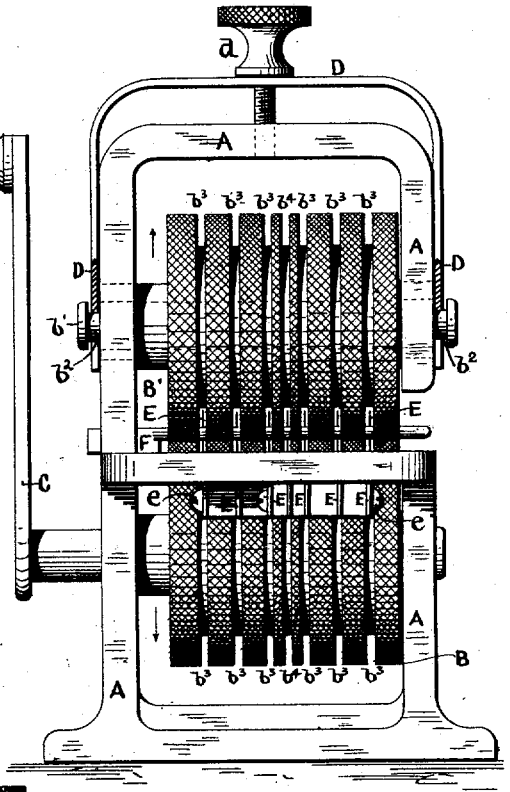
Figure 3:
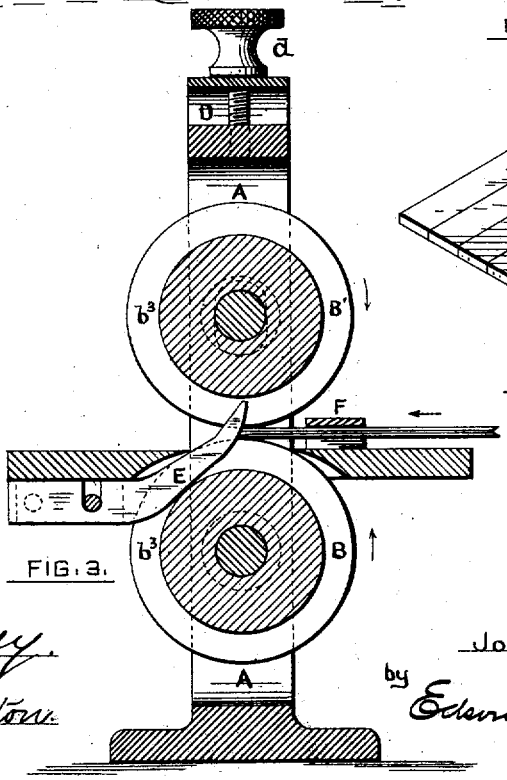
Figure 4:
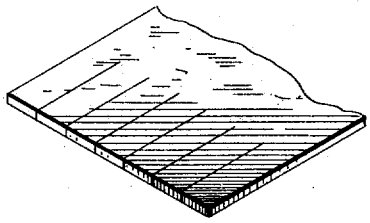

Referring to the drawings, Figure 1 represents in front elevation a machine embodying my improvement. Fig. 2 shows the same in rear elevation. Fig. 3 represents a vertical section of the machine. Fig. 4 shows a piece of material partially cut into strips.

A is the frame of the machine, which is adapted in any preferred manner to be attached to a bench or other object. In this frame is journaled a feed-roll, B, the shaft of which is provided with a crank, C, or other means for giving rotation to the roll. Located immediately above the roll B is a fellow feed-roll, B′, the shaft $b'$ of which passes through slots $a$ $a$ in the frame, as shown in Fig. 1, so that said roll may have vertical adjustment in the frame, in order that different thicknesses of materials may be fed. For the purpose of this adjustment the shaft $b'$ may be journaled in a rigid yoke, D, which can be raised and lowered by a thumb-screw, $d$. I prefer, however, to make the yoke D a spring, in order that the roll B′ may engage the material to be cut with a yielding pressure, so that should there be any variation in thickness the material will be more readily fed than if the yoke D were rigid. The roll B′ may be rigidly secured to its shaft; but I prefer to mount it loosely thereon, and provide the shaft near its ends with peripherical grooves $b'$, and to bifurcate the ends of the spring-yoke, and arrange said ends to fork the grooves in the shaft, as shown in Fig. 2, thereby allowing the parts to be more easily assembled. The peripheries of the rolls B B′, which may be smooth or roughened, are provided with a series of grooves, $b^3$, preferably located at equal distances apart, and in these grooves the cutting ends of the knives E are arranged, as shown in Fig. 3, with their cutting-edges inclined to the plane in which the material is fed, thereby securing a cleaner cut and requiring less expenditure of power than when said edges are placed at right angles to said plane. The knives are detachably secured to the frame of the machine by set-screws $e$, and the cutting ends are located in or slightly in the rear of a vertical plane passing through the axes of the rolls. The rolls may also be provided with other grooves, $b^4$, located between the grooves $b^3$, so as to give a greater range to the width of the strips cut by the machine, which is also preferably supplied with an adjustable gage, F, to govern the width of the side strip.

As shown in the drawings, the knives are arranged to cut six strips one-fourth of an inch in width: but by rearranging the knives strips varying from an eighth of an inch to one and one-half inch may be cut, and the number of strips may be increased by extending the rolls.

As shown in Figs. 1 and 2, one side of the frame A is left open, so that material of any width may be fed through the machine and strips be cut from one of its sides.

If preferred, the rolls B B′ or their shafts may be geared together, so that the roll B′ will be positively driven.

In place of the rolls being solid and having peripherical grooves turned therein, they may each be composed of a series of feeding-disks of equal diameters and of the same or varying widths, separated from each other by washers of less diamater, and all clamped upon their respective shafts by screw-nuts, in a well-known manner. By this construction a still greater variety in the widths of strips may be obtained.

What I claim as my invention, and desire to secure by Letters Patent, is—

1. The combination of a frame, a pair of feed-rolls mounted therein adjustable with relation to each other, and composed of a series of feeding-sections, which are separated at the circumference by annular spaces, and a series of knives secured to the frame and entering said spaces, with their cutting-edges inclined to the plane in which the material is fed, substantially as and for the purposes specified.

2. The combination of a frame having a side opening, as described, a pair of feed-rolls mounted therein, adjustable with relation to each other, and composed of a series of feeding-sections, which are separated at the circumferences by annular spaces, and a series of knives secured to the frame and entering said spaces, substantially as and for the purposes specified.

3. The combination of the frame A, having a side opening, as described, the feed-rolls B B′, yoke D, adjusting-screw *d*, and knives E, with their cutting-edges inclined to the plane in which the material is fed, substantially as described and shown.

4. The combination of the frame A, the feed-rolls B B′, yoke D, adjusting-screw *d*, knives E, and adjustable gage F, substantially as set forth.

JOHN N. WAKE.

Witnesses:
EDSON SALISBURY JONES,
ALLEN P. YOUNG.